United States Patent
Frail

(10) Patent No.: US 11,634,635 B2
(45) Date of Patent: Apr. 25, 2023

(54) POLYACRYLATE POLYMERS FOR LOW CARBON STEEL CORROSION CONTROL

(71) Applicant: BL Technologies, Inc., Minnetonka, MN (US)

(72) Inventor: Paul Robert Frail, Trevose, PA (US)

(73) Assignee: BL Technologies, Inc., Minnetonka, MN (US)

( * ) Notice: Subject to any disclaimer, the term of this patent is extended or adjusted under 35 U.S.C. 154(b) by 657 days.

(21) Appl. No.: 16/606,338

(22) PCT Filed: May 22, 2018

(86) PCT No.: PCT/US2018/033810
§ 371 (c)(1),
(2) Date: Oct. 18, 2019

(87) PCT Pub. No.: WO2018/217697
PCT Pub. Date: Nov. 29, 2018

(65) Prior Publication Data
US 2021/0189236 A1   Jun. 24, 2021

Related U.S. Application Data

(60) Provisional application No. 62/510,311, filed on May 24, 2017.

(51) Int. Cl.
*C09K 15/12* (2006.01)
*C02F 5/10* (2023.01)
(Continued)

(52) U.S. Cl.
CPC .............. *C09K 15/12* (2013.01); *C02F 5/105* (2013.01); *C08L 33/02* (2013.01); *C09K 15/06* (2013.01);
(Continued)

(58) Field of Classification Search
None
See application file for complete search history.

(56) References Cited

U.S. PATENT DOCUMENTS 3,649,547 A * 3/1972 Lummus et al. ........ C09K 8/24
507/120
3,711,246 A   1/1973 Foroulis
(Continued)

FOREIGN PATENT DOCUMENTS

CN   1496338 A   5/2004
CN   1565986 A   1/2005
(Continued)

OTHER PUBLICATIONS

International Search Report and Written Opinion in related International Application No. PCT/US2018/033810 dated Oct. 26, 2018; 12 pages.
(Continued)

*Primary Examiner* — Joseph D Anthony
(74) *Attorney, Agent, or Firm* — Armstrong Teasdale LLP

(57) ABSTRACT

Methods are provided to inhibit corrosion in low hardness water systems. The corrosion inhibiting treatment comprises: calcium salts of low molecular weight polymer polycarboxylic acids. These calcium salts may be added preformed to the water system in need of treatment or formed in-situ in the system. This method of corrosion inhibition is not a source of addition phosphorous or heavy metal to the treated system.

13 Claims, 4 Drawing Sheets

(51) Int. Cl.
*C08L 33/02* (2006.01)
*C09K 15/06* (2006.01)
*C23F 11/173* (2006.01)
*C02F 103/02* (2006.01)

(52) U.S. Cl.
CPC ...... *C23F 11/173* (2013.01); *C02F 2103/023* (2013.01); *C02F 2303/08* (2013.01)

(56) References Cited

U.S. PATENT DOCUMENTS

| | | | |
|---|---|---|---|
| 3,806,367 A | 4/1974 | Lange et al. | |
| 3,832,302 A | * 8/1974 | Lansford et al. | C02F 5/12 |
| | | | 252/180 |
| 3,941,562 A | 3/1976 | Hollingshad | |
| 3,953,344 A | * 4/1976 | Narushima | C10M 173/02 |
| | | | 508/423 |
| 3,965,027 A | 6/1976 | Boffardi et al. | |
| 4,303,568 A | 12/1981 | May et al. | |
| 4,409,121 A | 10/1983 | Latos et al. | |
| 4,443,340 A | 4/1984 | May et al. | |
| 4,530,766 A | 7/1985 | Hann et al. | |
| 4,663,053 A | 5/1987 | Geiger | |
| 4,931,188 A | * 6/1990 | Chen | C02F 5/125 |
| | | | 210/698 |
| 5,139,702 A | 8/1992 | Carter et al. | |
| 5,171,451 A | * 12/1992 | Khambatta | C02F 1/50 |
| | | | 210/764 |
| 5,308,498 A | 5/1994 | Fong et al. | |
| 5,589,106 A | 12/1996 | Shim et al. | |
| 6,228,283 B1 | 5/2001 | Turcotte et al. | |
| 7,727,420 B2 | 6/2010 | Ward | |
| 2005/0159568 A1 | * 7/2005 | Suau | C08F 2/10 |
| | | | 526/179 |
| 2014/0070134 A1 | * 3/2014 | Woyciesjes | C09K 5/20 |
| | | | 252/75 |
| 2015/0118103 A1 | 4/2015 | Erickson et al. | |
| 2015/0284859 A1 | 10/2015 | Erickson et al. | |

FOREIGN PATENT DOCUMENTS

| | | |
|---|---|---|
| CN | 100395199 C | 6/2008 |
| CN | 101429662 A | 5/2009 |
| CN | 104718316 A | 6/2015 |
| JP | H04166298 A | 6/1992 |
| WO | 2012085830 A2 | 6/2012 |

OTHER PUBLICATIONS

First Examination Report, Indian Patent Application No. 201917048622, dated May 20, 2021, 6 pages.

Forsgren, Amy, "Corrosion Control Through Organic Coatings", Published in 2006 by CRC Press Taylor & Francis Croup, LLC, Boca Raton, FL, ISBN: 978-0-8493-7278-0.

First Office Action and Search Report with English Translation, Chinese Application No. 201880034177.X, dated May 8, 2021, 24 pages.

Office Action and Search Report issued in Chinese Application No. 201880034177.X, with English translation, dated Dec. 1, 2021, 20 pages.

Office Action issued in European Patent Application No. 18770108.1, dated Oct. 19, 2022, 9 pages.

* cited by examiner

POLYACRYLATE POLYMERS FOR LOW CARBON STEEL CORROSION CONTROL

CROSS-REFERENCE TO RELATED APPLICATIONS

This application claims priority to U.S. Provisional Patent Application Ser. No. 62/510,311 filed May 24, 2017, the entirety of which is herein incorporated by reference.

FIELD OF INVENTION

The invention pertains to methods for inhibiting corrosion in aqueous systems. In some aspects, the methods are useful in inhibiting corrosion of systems that have low water hardness with treatments that are essentially free of phosphorus.

BACKGROUND OF THE INVENTION

Cooling water systems are used in many industrial settings. Most industrial settings need cooling water for efficient and proper operation. Cooling water systems rely on water to transfer heat from hot industrial processes to water which then carries the heat away. Non-limiting examples of industries that utilize cooling water systems are steel mills, manufacturing facilities, petrochemical plants, electric utilities, food plants, beverage plants, refineries and chemical processing plants. Non-industrial facilities such as office building and commercial facilities also use cooling water systems. HVAC units are examples of such non-industrial systems.

Typically cooling water systems are constructed of steel including low-carbon steel and optionally cement or concrete. Low carbon steel is typically used in construction of water cooling systems due to the positive durability, strength and cost characteristics of low carbon steel. Low carbon steel however is subject to corrosion in aqueous environments.

Corrosion can be defined as the destruction of a metal by chemical or electrochemical reaction with its environment. In cooling systems, corrosion causes two basic problems. The first and most obvious is the failure of equipment with the resultant cost of replacement and plant downtime. The second is decreased plant efficiency due to loss of heat transfer—the result of heat exchanger fouling caused by the accumulation of insoluble corrosion products.

Corrosion control requires a change in either the metal or the environment. The first approach, changing the metal, is expensive.

The second approach, changing the environment, is a widely used, practical method of preventing corrosion. Changing the environment may be accomplished by various, but not limiting, methods: changing cycles of concentration, adjusting controllable water characteristics (pH, oxidizer concentration, hardness, phosphate, etc.). Prevention of corrosion can occur by the addition of metal corrosion inhibitors that include one or more of the following cationic species: Cr, Mo, Al, Sn, Zn, etc.

A corrosion inhibitor is any substance which effectively decreases the corrosion rate when added to an environment. An inhibitor can be identified most accurately in relation to its function: removal of the corrosive substance, passivation, precipitation, or adsorption.

Some corrosion control programs require a certain hardness level to function correctly as corrosion inhibitors, so it is important to make sure hardness levels are not too low in these programs. When Ca concentration (ppm as $CaCO_3$) is less than 200, the water is considered low hardness. Low hardness conditions are known to be difficult to treat with respect to corrosion control. In some embodiments, low hardness water is less than 200 ppm Ca and mid-range hardness is between 200-400 ppm Ca as $CaCO_3$.

Phosphorus is the primary corrosion inhibitor used in industrial cooling towers. However, phosphorous is also a basic nutrient for biological growth. Too much phosphorus in the water causes algae to grow faster than ecosystems can handle. Significant increases in algae harm water quality, food resources and habitats, and decrease the oxygen that fish and other aquatic life need to survive. When phosphorous enters open water-ways it can cause algae and microbiological blooms that can consume oxygen and cause fish kills. Large growths of algae are called algal blooms and they can severely reduce or eliminate oxygen in the water, leading to illnesses in fish and the death of large numbers of fish. Some algal blooms are harmful to humans because they produce elevated toxins and bacterial growth that can make people sick if they come into contact with polluted water, consume tainted fish or shellfish, or drink contaminated water Governments around the world are restricting the discharge of nutrients such as phosphorus. The tighter discharge restrictions of phosphorus in industrial water treatment make the requirement for low environmental impact corrosion inhibitors more urgent.

With the tightened discharge limit on phosphorus (P) containing water treatment programs around the world, "low P" or "non P" industrial cooling water treatment programs are being requested, especially to those plants that discharge directly to rivers and lakes. Many places have phosphorous discharge limit of 3 ppm as $PO_4$.

Zinc and various other cationic metals (Al, Sn, Mo, Cr, etc.) are another corrosion inhibiting additive that forms a protective coating on surfaces prone to corrosion. The addition of low levels of zinc and cationic metals in the form of a $M^{n+}$ (M=cationic metal and N=oxidation state of the metal) salt for example $ZnCl_2$, ZnO or $ZnSO_4$ can be effective corrosion inhibition adjuncts used in combination in particular with phosphate based corrosion inhibitors for example HEDP or all organic deposition control inhibitors such as anionic polymers (polyacrylic, polymaleic, copolymers, and terpolymers).

SUMMARY OF THE INVENTION

According to an aspect of the present disclosure, a method of inhibiting corrosion of metals in contact with an aqueous system is provided. The method comprising: adding a corrosion inhibiting polymeric polycarboxylate to an aqueous system. In some embodiments, the polymeric polycarboxylate is selected from the group consisting of homopolymers, co-polymers, ter-polymers, or quad-polymers.

In an embodiment, the co-polymers, ter-polymers or quad-polymers of the polymeric polycarboxylate consist of monomers selected from the group consisting of acrylic acid, epoxy succinic acid, maleic acid, itaconic acid, vinyl glyceral ether, glyceral diol, and methacrylic acid.

In an embodiment, the aqueous system comprises a low water hardness system. In some embodiments, the aqueous system comprises a low P water system. In some embodiments, the method further includes a treatment essentially free of zinc.

In an embodiment, the aqueous system includes a treatment comprising a calcium concentration of less than 200 ppm of hardness, and the average molecular weight of said polymeric polycarboxylate of at least 5000 g. In other embodiments, the aqueous system includes a treatment comprising a calcium concentration of about 200-400 ppm of hardness, and the average molecular weight of said polymeric polycarboxylate of at least 2500 g.

In an embodiment, the polymeric polycarboxylate is selected from the group consisting of (i) a low molecular weight homopolymer of acrylic acid and salts thereof, (ii) a low molecular weight homopolymer of methacrylic acid and salts thereof, or (iii) a low molecular weight co-polymer of acrylic acid and methacrylic acid and salts thereof. In other embodiments, the polymeric polycarboxylate is selected from the group consisting of (i) calcium salts of a low molecular weight homopolymer of acrylic acid, (ii) calcium salts a low molecular weight homopolymer of methacrylic acid, or (iii) calcium salts of a low molecular weight co-polymer of acrylic acid and methacrylic acid.

In other embodiments, the polymeric polycarboxylate is a calcium salt of a polymeric polycarboxylate and wherein the calcium salt is pre-formed prior to addition to the aqueous system. In other embodiments, the polymeric polycarboxylate is formed by the reaction of an essentially acidic precursor with an inorganic calcium salt.

In an embodiment, the polymeric polycarboxylate is formed by the reaction of an essentially acid precursor with a calcium salt selected from the group consisting of calcium carbonate, calcium hydroxide, calcium magnesium carbonate, calcium silicate, calcium dolomite or combinations thereof. In an embodiment, the polymeric polycarboxylate is added at doses of between 1-1000 ppm.

According to yet another aspect of the present disclosure, a method of inhibiting corrosion of metals in contact with an aqueous system is provided. The method comprising: reacting an organic anionic polymer with a calcium salt to form a Ca-polymer complex outside of an aqueous system; and adding said Ca-polymer complex to the aqueous system.

In an embodiment, the organic anionic polymer is polycarboxylic acid, and is partially or fully protonated. In other embodiments, the polycarboxylic acid is selected from the group consisting of homopolymers, co-polymers, ter-polymers, or quad-polymers. In another embodiment, the polycarboxylic acid comprises carboxyl functionality or water soluble salts of carboxyl groups.

In an embodiment, the co-polymers, ter-polymers or quad-polymers of the polymeric polycarboxylate consist of monomers selected from the group consisting acrylic acid, epoxy succinic acid, maleic acid, itaconic acid, vinyl glyceral ether, glyceral diol, and methacrylic acid. In an embodiment, the calcium salt is an alkaline calcium salt.

In an embodiment, the aqueous system includes a calcium concentration of less than 200 ppm of hardness, and the polycarboxylic acid comprises an average molecular weight of at least 5000 g prior to formulating the Ca-polymer complex. In other embodiments, the aqueous system includes a calcium concentration of about 200-400 ppm of hardness, and said polycarboxylic acid comprises an average molecular weight of at least 2500 g prior to formulating said Ca-polymer complex.

According to yet another aspect of the present disclosure, a method of inhibiting corrosion of metals in contact with an aqueous system is provided. The method comprising: reacting a polycarboxylic acid polymer with a reactive calcium salt to form a corrosion inhibiting treatment, the corrosion inhibiting treatment comprising a calcium salt of the polycarboxylic acid, and adding the corrosion inhibiting treatment to an aqueous stream.

In an embodiment, the corrosion inhibiting treatment is pre-formed prior to the addition of the corrosion inhibiting treatment to the aqueous stream. In an embodiment, salts are present in the aqueous stream, wherein the zinc salts are selected from the group consisting of ZnO, $ZnCl_2$, $ZnBr_2$ or $ZnSO_4$.

In an embodiment, the corrosion inhibiting treatment may be formed in situ by feeding separate solutions of the reactive calcium salt and the polycarboxylic acid polymer.

In an embodiment, the corrosion inhibiting treatment is administered either to the incoming make-up water of an industrial cooling unit, or directly to an aqueous stream of a cooling unit system. In an embodiment, the aqueous stream comprises a low water hardness. In an embodiment, the aqueous stream comprises a low phosphorus content.

According to yet another aspect of the present disclosure, a method of inhibiting corrosion of metals in contact with an aqueous system is provided. The method comprising: adding to an aqueous system a corrosion inhibiting polymeric polycarboxylate calcium salt in a dosing of between about 200-1000 ppm, wherein the aqueous system comprises a low water hardness. In some embodiments, the dosing occurs at a continuous and steady rate.

In an embodiment, the method further comprises adding an additional dose of the polymeric polycarboxylate calcium salt at a later time and at a level to maintain an effective corrosion inhibiting concentration of the inhibiting polymeric polycarboxylate calcium salt. In other embodiments, the additional dose of the polymeric polycarboxylate calcium salt is between 1-100 ppm.

In an embodiment, the method further includes a corrosion meter to determine the feed and decay cycles or additional dose to improve corrosion rates.

In an embodiment, the method further comprises a dispersant, wherein the dispersant is a co-polymer or ter-polymer including sulfonated monomers. In an embodiment, the sulfonated monomers are selected from the group consisting of ammonium allyl polyethoxy sulfate (APES) and 2-acrylamido-2-methylpropane sulfonic acid (AMPS).

In an embodiment, the method further includes a treatment essentially free of zinc.

DETAIL DESCRIPTION OF THE INVENTION

Figure 1:
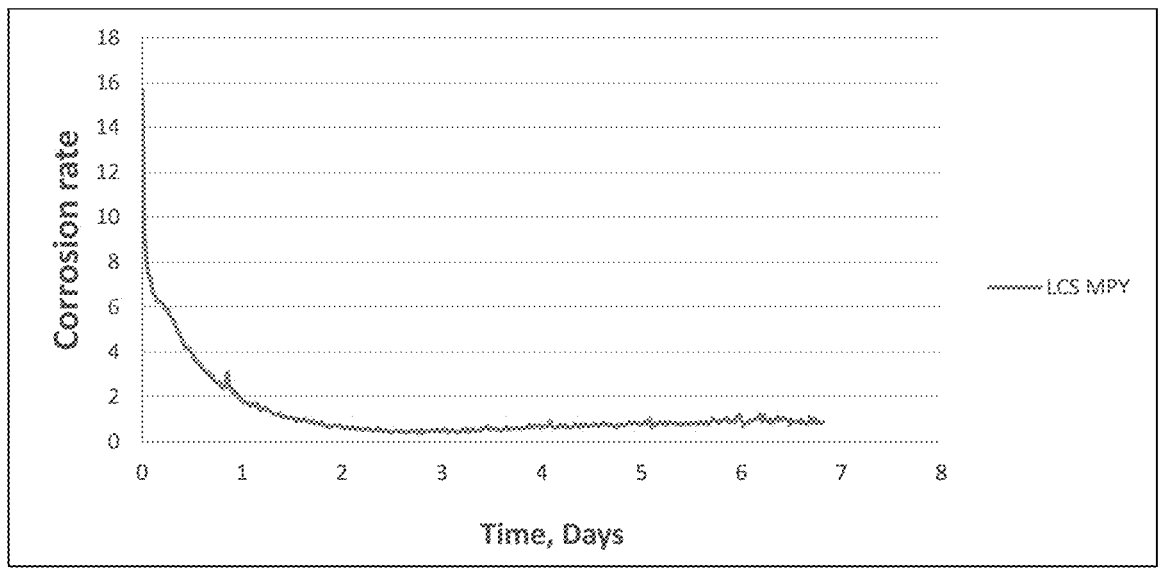
FIG. 1 is a graph showing results corrosion of metal coupons in a system that has very low hardness water and polyacrylic acid calcium salt over time.
Figure 2:
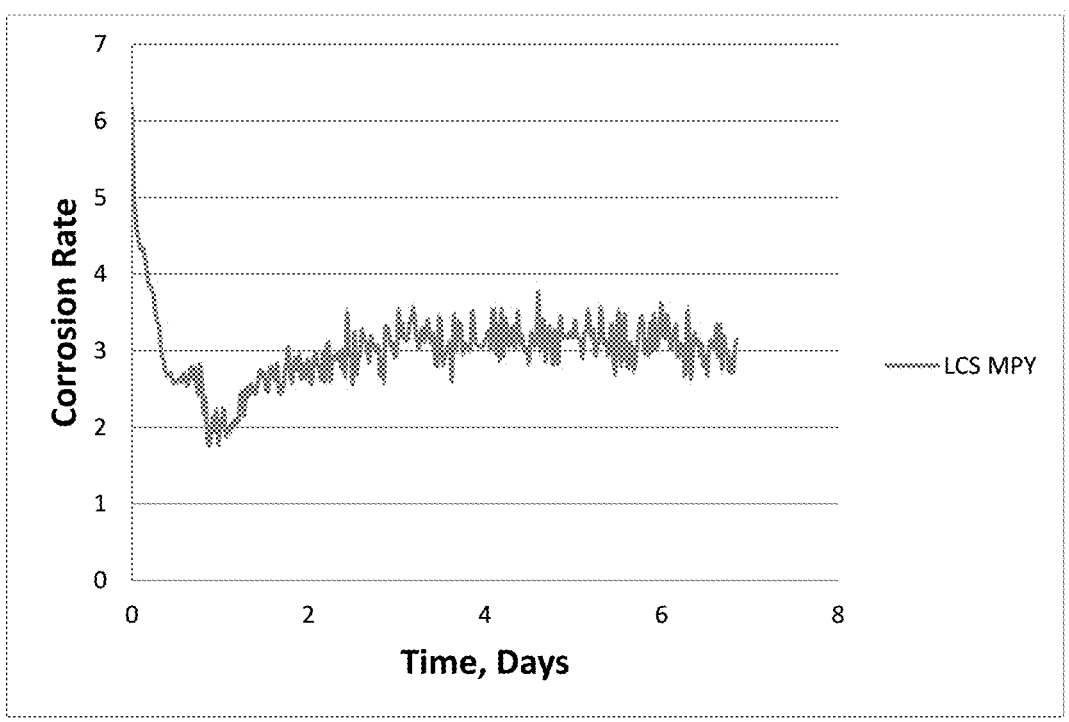
FIG. 2 is a graph showing results corrosion of metal coupons in a system that has low hardness water and polyacrylic acid calcium salt over time.
Figure 3:
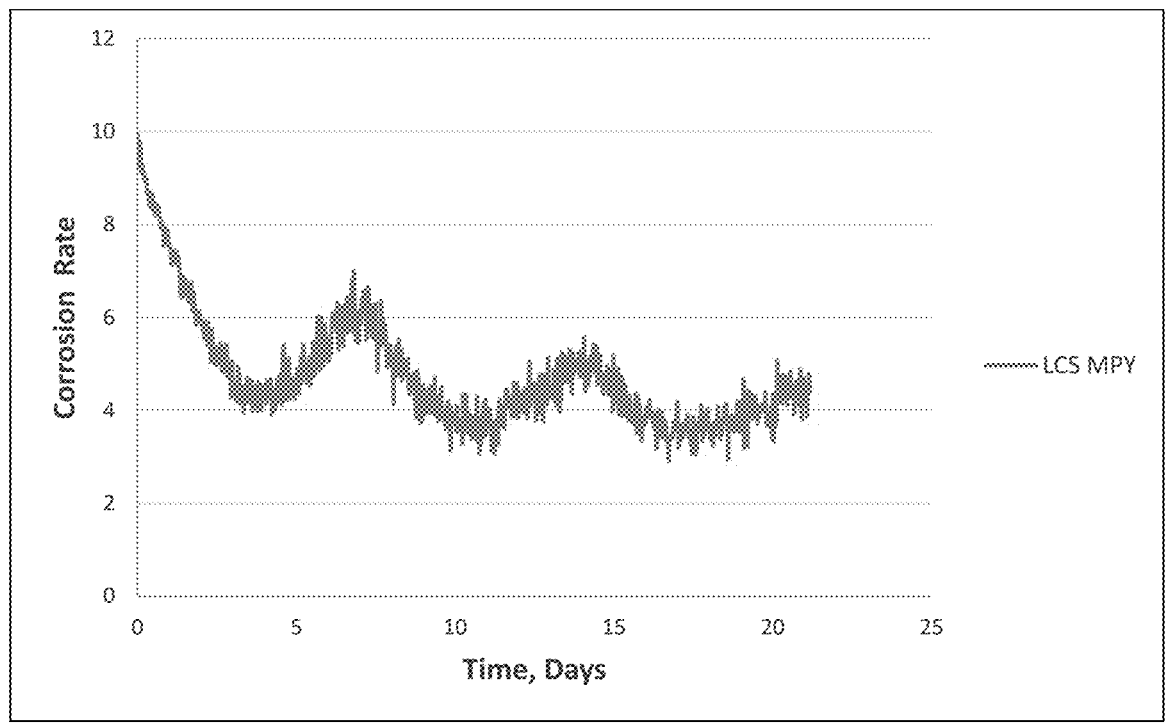
FIG. 3 is a graph showing results corrosion of metal coupons in a system having polyacrylic acid calcium salt in the absence of $Zn^{2+}$ salts over time.
Figure 4:
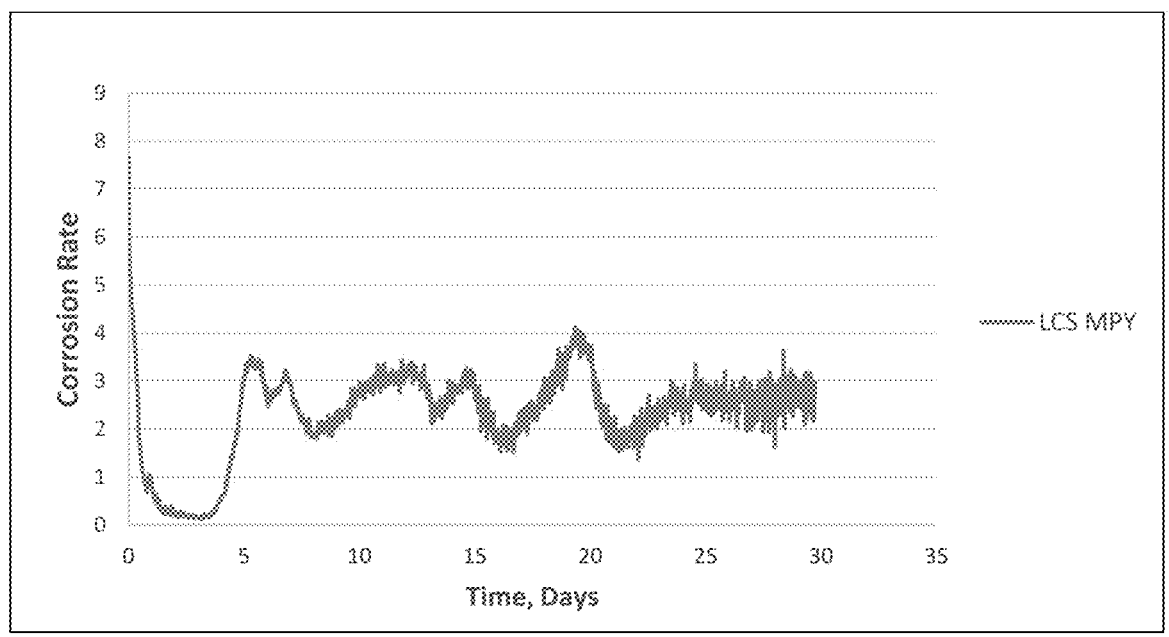
FIG. 4 is a graph showing results corrosion of metal coupons in a system that is automatically fed polyacrylic acid calcium salt in the presence of Zn' salts over time.
Figure 5A:
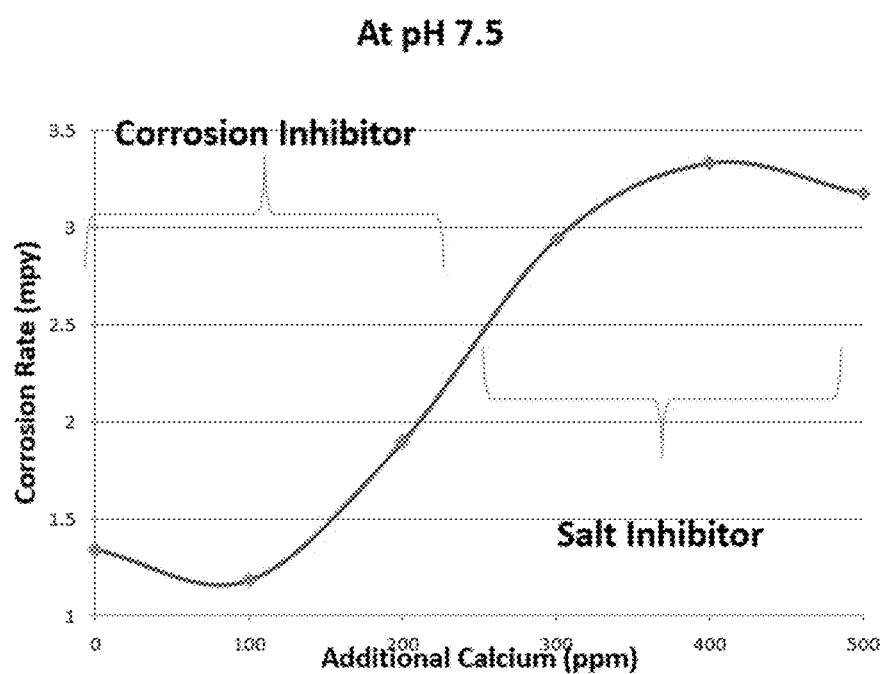
FIGS. 5A and 5B are graphs of PAA-2 (5000 g average) at pH 7.5 and 8.5, respectively, showing the Ca ranges where it behaves as a corrosion inhibitor versus a salt inhibitor, and where the corrosion rates increase above 200 ppm Ca because the polycarboxylic polymer is no longer available for corrosion protection as it becomes consumed by the salt inhibition mechanism.
Figure 5B:
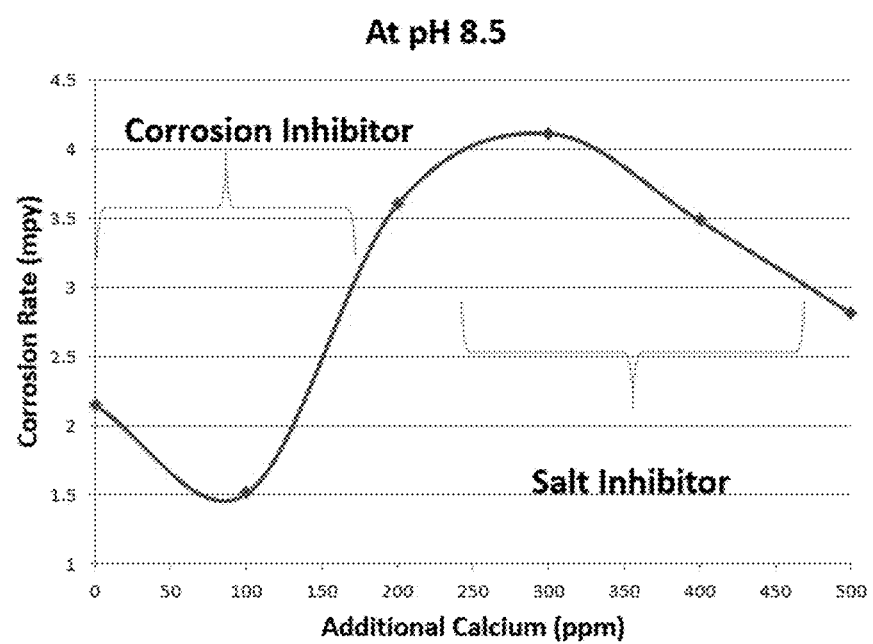

The invention will now be described in the following detailed description with reference to the drawing(s), wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

All organic anionic polymers are ubiquitous in industrial water treatment for the prevention of scale and fouling on industrial heat exchangers, transfer lines, and cooling tower fill. Typically, anionic polymers are used on scales that consist of salts with inverse solubility: calcium carbonate, calcium phosphate, etc. These systems the calcium content, M-alk, pH, o-PO4 are elevated such as the salts become super saturated and at equilibrium have the potential to scale. The flow rate and retention time of a cooling system will allow some salts to be super saturated and have no risk of scaling in the industrial system. Under no or low phosphorous conditions there is minimal risk for calcium phosphate scale. Low hardness waters when a sulfonated dispersant polymer is used, it is not necessary to have a calcium carbonate anionic polymer added as a calcium carbonate inhibitor. When it is added to the system, since there is no risk of salt scaling, the anionic inhibitor behaves as a corrosion inhibitor. The anionic polymer corrosion inhibitor is calcium dependent, as calcium increases so does the corrosion rates, due to the added species switching roles from a corrosion inhibitor under low hardness to a salt inhibitor preventing scale.

In one aspect of the invention, an all organic anionic polymer is applied to an aqueous stream for an industrial system. An all organic anionic polymer has a distribution of molecular weights with an average, Mw, centered around ~2500 or 5000. The all organic anionic polymer may be fully or partially protonated with charge balanced by cationic metal ions (Na, K, Mg, Ca, etc.). The anionic polymer can be a homopolymer polymerized from a carboxylic acid monomer. Carboxylic acid monomers consist of acrylic, maleic, itaconic, etc. Copolymers or higher order mixed polymers (ter- or quad-polymers) consisted primarily of carboxylic acid monomers or include non-ionic monomers that feature alcohol groups.

In some embodiment, the anionic polymer comprises an average molecular weight in a range of about 2000 g to about 6000 g. In some embodiment, the anionic polymer comprises an average molecular weight in a range of about 4000 g to about 6000 g.

In some embodiments, when the industrial water system is of low hardness, less than 200 ppm Ca as CaCO3, then the all organic anionic polymers have an Mw centered around 5000. When the hardness is between 200-400 ppm Ca as CaCO3 the Mw is centered around 2500.

In some embodiments, all organic anionic polymers are fed into the aqueous stream in a concentration between 1-1000 ppm of active material, 5-50 ppm, and preferably 15-30 ppm. The concentration is measured as the average over a set time.

In some embodiments, a cationic metal or combination of metals may be used to further decrease corrosion rates compared to all organic anionic polymers without metals. Additionally, the use of cationic metals can further decrease the average measured polymer depending on performance standards (corrosion rate).

In one aspect of the invention the fully protonated all organic anionic polymer is reacted, acid-base chemistry, with an alkaline calcium salt to form a partially Ca-polymer complex outside of the aqueous water stream and then added to the industrial stream. Alternatively, the Ca-polymer complex can be formed in-situ mixing in stream utilizing common Ca salts such as CaCl2. An example of an alkaline calcium salt is calcium carbonate, dolomite, and calcium meta-silicate. In some embodiments, the in situ mixing can include both inorganic calcium salts and alkaline calcium salts.

In some embodiments, the formation of the Ca-polymer complex causes the secondary structure of the polymer to be pre-formed such that the complex is more suitable to passivate a metal surface and further lead to a reduction of corrosion rates.

In some embodiments, when the industrial water system has low hardness, less than 200 ppm Ca as CaCO3, the Mw of the polymer will be 5000 g prior to formulating the Ca-polymer complex. If the industrial water system has hardness between 200-400 ppm Ca as —CaCO3, the Mw of the polymer will be 2500 g prior to formulating the Ca-polymer complex.

In some embodiments, the Ca-polymer complex will be fed between 1-1000 ppm average active species. More likely between 5-50 ppm, and preferred 15-30 ppm average active species.

In some embodiments, a cationic metal or combination of metals may be used to further decrease corrosion rates compared to all organic anionic polymers without metals. Additionally, the use of cationic metals can further decrease the average measured polymer depending on performance standards (corrosion rate).

In one aspect of the invention, a calcium salt of a polymeric acid is applied to an aqueous industrial system. By aqueous industrial system we mean cooling water systems and the like. Non-limiting examples of industries that utilize cooling water systems are steel mills, manufacturing facilities, petrochemical plants, electric utilities, food plants, beverage plants, refineries and chemical processing plants. Non-industrial facilities such as office building and commercial facilities also use cooling water systems. HVAC units are examples of such non-industrial systems.

As generally known, a cooling tower is one type of cooling water system that rejects waste heat to the atmosphere through the cooling of a water stream to a lower temperature. Cooling towers may either use the evaporation of water to remove process heat and cool the working fluid to near the wet-bulb air temperature or, in the case of closed circuit dry cooling towers, rely solely on air to cool the working fluid to near the dry-bulb air temperature.

Cooling towers vary in size from small roof-top units to very large hyperboloid structures that can be up to 200 meters (660 ft) tall and 100 meters (330 ft) in diameter, or rectangular structures that can be over 40 meters (130 ft) tall and 80 meters (260 ft) long. The hyperboloid cooling towers are associated with nuclear power plants, some coal-fired plants and to some extent in some large chemical and other industrial plants. Although these large towers are very prominent, the majority of cooling towers are much smaller, including many units installed on or near buildings to discharge heat from air conditioning.

There are two distinct types of systems for water cooling and reuse: open and closed recirculating systems. In an open recirculating system, cooling is achieved through evaporation of a fraction of the water. Evaporation results in a loss of pure water from the system and a concentration of the remaining dissolved solids. Water must be removed, or blown down, in order to control this concentration, and fresh water must then be added to replenish the system.

A closed recirculating system is a cooling system within a cooling system. The water containing the heat transferred from the process is cooled for reuse by means of an exchange with another fluid. Water losses from this type of system are usually small.

Typically cooling water systems are constructed of steel including low-carbon steel and optionally cement or concrete. Low carbon steel is typically used in construction of water cooling systems due to the positive durability, strength and cost characteristics of low carbon steel. Low carbon steel however is subject to corrosion in aqueous environments.

As used herein, polycarboxylate polymer designates homopolymers, co-polymers, and terpolymers wherein at least some of the repeat units comprise carboxyl functionality or water soluble salts of carboxyl groups. Exemplary polycarboxylate polymers include acrylic acid and methacrylic acid polymers, copolymers, and terpolymers, polymaleic acid polymers, copolymers and terpolymers and polyepoxysuccinic acid (PESA) polymers. However, one skilled in the art would readily understand the definition of a carboxylic acid monomer.

In one aspect of the invention, the calcium salt of the polycarboxylic acid is added to an aqueous system which comprises low hardness water. By the term low hardness water, we mean, waters which are low in measured calcium content. In terms of this disclosure 0 to 60 mg/L (milligrams per liter) of hardness as calcium carbonate is classified as low hardness water conditions.

In one aspect of the invention, the calcium salt of the polycarboxylic acid is added to an aqueous system which comprises low phosphorous water. By the term low phosphorous water, we mean, waters which are low in measured phosphorous content. In terms of this disclosure 0 to 1 mg/L (milligrams per liter) of phosphorous is classified as low phosphorous water conditions.

In some embodiments, the calcium salts of the polymeric carboxylic acids are formed by treating polycarboxylate polymer with a reactive calcium salt. Such reactive calcium salts are exemplified by but not limited to calcium carbonate, calcium hydroxide, calcium magnesium carbonate, calcium silicate or dolomite or combinations thereof. The calcium salts of the polymeric carboxylic acids may be pre-formed prior to (or formed ex situ) the addition of said calcium salts of the polymeric carboxylic acids to the aqueous system to be treated. Alternatively, the calcium salts of the polymeric carboxylic acids may be formed in situ by feeding separate solutions of the calcium salt and the polymeric carboxylic acid in its native acidic form.

In some embodiments, the calcium salt of the polycarboxylic acid is administered either to the incoming make-up water of the industrial cooling unit or directly to the aqueous environment of the cooling unit system which is in need of treatment. In one conception of the invention the calcium salt of the polycarboxylic acid is added to the make-up water of the cooling system.

The dosing of the treatment of the industrial water system may be continuous at a steady rate or may be punctuated by the addition of the treatment in shot doses at various time intervals.

Other embodiments are directed toward inhibition corrosion in industrial systems by feeding a system in need of treatment with an initial dose of treatment. At some time after the initial dosing, supplementary dosing is then administered to maintain an effective level the polycarboxilic acid calcium salt. In some embodiments, the initial treatment is dosed at a level of between 30 ppm or 1000 ppm. After some period of time the concentration of treatment in the system will then reach a level at which the concentration of the polycarboxilic acid calcium salt available to the system is no longer at a peak effective concentration. When such a state is reached, supplemental dosing of the polycarboxylic acid calcium salt is then effected. In some embodiments, these supplementary maintenance treatments are dosed at a level of between 1 ppm or 100 ppm. In some embodiments, the use of corrater or corrosion probes is used to measure instantaneous corrosion rates. Based on these real time values when the instantaneous rate exceeds a maximum corrosion rate threshold, a supplemental dose of inhibitor is triggered. Additionally, feed and control processes can use online corrosion probes.

In some embodiments of the invention, the level of polycarboxilic acid calcium salt in the aqueous system being treated is determined by measuring the actual level of said polycarboxilic acid calcium salt. In non-limiting examples the levels of said polymeric polycarboxylic acid calcium salts may be determined calorometrically or by electrovoltaic measurements or by other methods known in the art for determining the concentration of polymers in aqueous solutions. Alternatively, the level of polycarboxilic acid calcium salt in the aqueous system being treated may be estimated based on the known conditions (for example, depletion of the polymer agent, turn-over of the water system, amount draw off from the system being treated, among other factors).

In some embodiments, the polycarboxilic acid calcium salt may be added to the system in need of corrosion protection with additional metal salt based corrosion inhibitors.

In accordance with one exemplary embodiment, the molecular weight of the calcium salt of the calcium salts of polycarboxylic acid treatments falls within the range of about Mw 1.00-10,000.

In one aspect of the invention, the calcium salt of the polymeric carboxylic acid comprises the calcium salt of poly acrylic acid. Said calcium salt of poly acrylic acid is formed by reacting calcium carbonate with an aqueous solution of polyacrylic acids.

In one exemplary embodiment, the addition of zinc in the form of a $Zn^{2+}$ salt to the system in need of treatment is envisioned. In some embodiments, zinc salts are selected from the group consisting of $ZnO$, $ZnCl_2$, $ZnBr_2$, $ZnSO_4$, or the like. In some embodiments, a metal cationic corrosion inhibitor with a level of Zn that is less than or equal to 1 ppm can be selected.

EXAMPLES

Beaker Corrosion Testing

This test evaluates the corrosion protection of low carbon steel in 1.9 L of synthetic water in a beaker. Corrosion rates are measured by the linear polarization method at fixed time increments. The linear polarization is measured in a 3-electrode configuration: working, counter, and reference electrodes. Experiments are run at various temperatures between 80-120° F. to match industrial water systems. Water conditions vary in the target levels of hardness, silica, phosphate, and alkalinity. Solution pH is measured at the beginning using a pH probe and adjusted to desired set point with acid or base throughout the testing period. Bleach is typically added at one time after a passivation period of roughly 18 hours. Deposit coupons may be added to the test to better visualize corrosion patterns or if any potential scaling has occurred during the test.

Recirculating Tests

Feature a recirculating pump, heat transfer tube, piping fitted with coupon and corrosion rate probe rake. Synthetic water is added to the system with chemical treatment and a constant volume is maintained throughout the duration of the test. Heat transfer tubes are used to mimic a heat transfer surface and identify corrosion or deposit failures. Heat transfer tubes can be a variety of metals depending on which needs to be studied: stainless steel, low carbon steel, and/or admiralty. Online corrosion monitor feature a Corrater measures instantaneous corrosion rates. Coupons were polished and pre-weighed prior to inserting into the sample rack. Day 1, a pre-filming step is performed where only synthetic cooling water and chemical treatments are circulated within the system at temperature and without chlorination overnight. 18 to 20 hours later a pre-weighed stock solution of bleach was fed into the recirculating unit and maintained at 0.2-0.3 ppm with oxidation reduction potential, ORP control. The experiment was run for 7-30 days and the coupons, and CRM probes were removed, washed, and dried for final weighing and observation and the heat transfer tube was examined for deposit, pits, and corrosion.

Online Corrosion Monitor

Any electrochemical instrument that utilizes the linear polarization method to obtain instantaneous corrosion rates. Typical instruments use either 2 or 3 electrode setups; typically, 2 electrode setup that features a solution resistance correction factor. The meter is mounted in an industrial water stream and periodically measured the corrosion rates. Data is either stored locally with a data logger or is transmitted wirelessly to data centers. Electrodes match the metallurgy of the industrial system: low carbon steel, stainless steel, and yellow metals such as admiralty. The metal probes need to be changed very 3-6 months. Corrosion meters that have the correct electrical set up may be used to adjust product feed where corrosion product feed rates are increases, effectively increasing inhibitor concentration within the industrial system, when instantaneous corrosion rates reach a maximum set point. Corrosion product pump feed can then be reduced, effectively lowering the product concentration within the industrial system, once the instantaneous corrosion rates reach a minimum set point.

The following examples are included as being illustrative of the invention and shall not be construed as limiting the scope thereof.

In order to assess the efficacy of the corrosion inhibiting composition of the invention, tests were performed and measurements were made by the following general reaction:

$$2P\text{—}COOH + CaCO_3 \rightarrow Ca^{2+} + 2P\text{—}COO^- + CO_2 + H_2O$$

This reaction forms a Ca-polymer complex.

TABLE I

| Example Formulation | | |
|---|---|---|
| | Example 1 | Example 2 |
| Polyacrylic Acid | 30 wt. % | 30 wt. % |
| Water | 10 | 10 |
| Ca source | 5 CaCO$_3$ | 5 CaSO$_4$ |
| Water | 5 | 5 |
| Heat | 45° C. 60 min | 45° C. 60 min |
| Final Appearance | Clear and viscous | Milky white gel |

| | MPY |
|---|---|
| 20 ppm PAA (5000 MW) | 2.1 |
| 20 ppm PAA-Ca | 1.6 |

TABLE 2

| Treatment 1- No Zn | Ca range (ppm) | Dose range Polymer (ppm) | PO4 range (ppm) | pH range | Polymer MW (g) |
|---|---|---|---|---|---|
| Homo or Co or Ter Polymers featuring COOH and OH groups | less than 200 | 15-50 | 0-1 | 7.5-9.0 | ~5000 |
| | 200-400 | 15-15 | 0-1 | 7.5-9.0 | ~2500 |
| Treatment 2- Formulated with Ca pretreat homo polymers with Ca no Zn | less than 200 | 15-50 | 0-1 | 7.5-9.0 | ~5000 |
| | 200-400 | 15-15 | 0-1 | 7.5-9.0 | ~2500 |

TABLE 3

| Run # | Polymer | Dose (ppm) | pH | oPO4 | Ca | SiO2 | M-alk | Mw | Avg Coupon | Avg Probe |
|---|---|---|---|---|---|---|---|---|---|---|
| 1 | PAA-1 | 30 | 7.6 | 0 | 45 | 50 | 50 | 5590 | 2.44 | 2.09 |
| 2 | PAA-1 | 30 | 7.6 | 0 | 45 | 50 | 50 | 5590 | 1.89 | 1.52 |
| 3 | PAA-2 | 30 | 7.6 | 0 | 45 | 50 | 50 | 4660 | 1.79 | 1.33 |
| 4 | PAA-3 | 30 | 7.6 | 0 | 45 | 50 | 50 | 6270 | 3.16 | 1.81 |
| 5 | PAA-4 | | 7.6 | 0 | 45 | 50 | 50 | 2590 | 6.7 | 3.66 |
| 6 | PAA-5 | 30 | 7.6 | 0 | 45 | 50 | 50 | 2390 | 5.08 | 3.01 |
| 7 | PAA-6 | 30 | 7.6 | 0 | 45 | 50 | 50 | 2320 | 4.69 | 2.62 |
| 8 | PAA-1 | 30 | 7.9 | 0 | 45 | 70 | 50 | 5590 | 2.29 | 1.53 |
| 9 | PAA-3 | 20 | 7.9 | 0.5 | 70 | 50 | 108 | 6270 | 2.13 | 1.18 |
| 10 | PMA-1 | 20 | 7.9 | 0.5 | 70 | 50 | 108 | >1000 | 7.72 | 5.3 |
| 11 | PAA-3 | 20 | 8 | 0 | 56 | 150 | 36 | 6270 | 2.78 | 1.88 |
| 12 | PMA-2 | 20 | 8 | 0 | 56 | 75 | 36 | <1000 | 13.23 | 6.15 |
| 13 | AA-AMPS | 5 | 8 | 0 | 56 | 75 | 36 | NA | 14.7 | 6.42 |
| 14 | PMAA | 20 | 8 | 0 | 56 | 75 | 36 | NA | 15.52 | 6.26 |
| 15 | PAA-7 | 20 | 8 | 0 | 56 | 75 | 36 | 100K | >20 | >20 |
| 16 | PAA-2 | 30 | 8 | 0 | 45 | 50 | 50 | 4660 | 1.2 | 0.73 |
| 17 | PAA-2 | 30 | 8 | 0 | 176 | 50 | 50 | 4660 | 2.62 | 0.91 |
| 18 | PAA-2 | 30 | 8 | 0 | 220 | 50 | 50 | 4660 | 6.05 | 2.98 |
| 19 | PAA-2 | 30 | 8 | 0 | 704 | 50 | 50 | 4660 | 16.9 | 6.83 |

TABLE 3-continued

| Run # | Polymer | Dose (ppm) | pH | oPO4 | Ca | SiO2 | M-alk | Mw | Avg Coupon | Avg Probe |
|---|---|---|---|---|---|---|---|---|---|---|
| 20 | PAspA | 30 | 8 | 0 | 56 | 75 | 36 | NA | 4 | 6.5 |
| 21 | PAA-5 |  | 8 | 0 | 220 | 50 | 50 | 2390 | 2.59 | 1.83 |

Table 3 shows data that was collected from recirculating tests. PAA is polyacrylic acid. PAA-1 is ACUMER™ 1100 scale inhibitor obtained from Dow Chemical. PAA-2 is SNF 3000 obtained from SNF. PAA-3 is Suez WTS proprietary polyacrylic acid. PAA-4 is Noverite™ K-752 polymer obtained from Lubrizol. PAA-5 is Noverite™ K-7028 polymer obtained from Lubrizol. PAA-6 is ACUMER™ 1035 obtained from Dow Chemical Company. PAA-7 is polyacrylic acid obtained from Aldrich. PAspA is polyaspartic acid obtained from Nanotech. PMA-1 is polymaleic acid, specifically, Belclene® 200 obtained from BWA Water Additives. PMA-2 is a polymaleic acid that is Suez WTS proprietary. AA-AMPS is ACUMER™ 2000 obtained from Dow Chemical Company. PMA-1 is polymaleic acid Belclene 200 obtained from BWA Water Additives. PMA-2 is proprietary polymaleic acid from Suez WTS. PMAA is polymethyl acrylate. CoPAA is a copolymer of acrylic acid and sulfonated monomer.

With reference to Table 3, Runs 1-4 and 11 show that the MW 5000 polymers and Ca<200 are effective corrosion inhibitors (mpy is less than 3 on coupon). Runs 8-9 are the same as Runs 1-4, except at a different pH.

In comparative examples, Runs 5-7 show MW 2500 polymers and Ca<200 are not effective corrosion inhibitors (mpy is greater than 3 on coupon). Run 10 shows that PMA is not an effective corrosion inhibitor when the MW is less than 1000. Run 12 shows that PMA is not effective corrosion inhibitor. Run 13 shows that an acrylic copolymer which includes a sulfonic acid group is not effective corrosion inhibitor. Run 14 show that methyl methacrylate is not an effective corrosion inhibitor. Run 15 shows that a high MW PAA is not effective corrosion inhibitor when Ca<200. Run 20 shows that polyaspartic acid, a known scale and corrosion inhibitor, is not effective. Further, Runs 16-19 provide for the Ca dependency for 5000 MW PAA for a given pH.

In an exemplary embodiment, as shown in Run 21, the MW 2500 polymers are effective as corrosion inhibitors when Ca is ~200-400 ppm.

While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A method of inhibiting corrosion of metals in contact with an aqueous system, the method comprising:
   adding a corrosion inhibiting polymeric polycarboxylate to an aqueous system,
      wherein said polymeric polycarboxylate is selected from the group consisting of homopolymers, co-polymers, ter-polymers, or quad-polymers,
      wherein said co-polymers, ter-polymers or quad-polymers of said polymeric polycarboxylate consist of monomers selected from the group consisting of acrylic acid, epoxy succinic acid, maleic acid, itaconic acid, vinyl glyceral ether, glyceral diol, and methacrylic acid; and
      wherein said polymeric polycarboxylate is a calcium salt of the polymeric polycarboxylate formed by the reaction of an essentially acidic precursor with an inorganic calcium salt; and
      wherein said polymeric polycarboxylate is added to said aqueous system at doses of between 1-1000 ppm,
      and wherein (i) the aqueous system comprises a calcium concentration less than 200 ppm of hardness, and the polymeric polycarboxylate has an average molecular weight of at least 4660 g, or (ii) the aqueous system comprises a calcium concentration from about 200 ppm to about 400 ppm of hardness, and the polymeric carboxylate has an average molecular weight from about 2000 g to about 2500 g.

2. The method as recited in claim 1, wherein said aqueous system comprises a low water hardness system, or a water system having a phosphorous discharge limit of 3 ppm as $PO_4$.

3. The method as recited in claim 1, wherein the method is essentially free of zinc.

4. The method as recited in claim 1, wherein said polymeric polycarboxylate is selected from the group consisting of (i) calcium salts of a homopolymer of acrylic acid, (ii) calcium salts of a homopolymer of methacrylic acid, or (iii) calcium salts of a co-polymer of acrylic acid and methacrylic acid.

5. The method as recited in claim 1, wherein said inorganic calcium salt is selected from the group consisting of calcium carbonate, calcium hydroxide, calcium magnesium carbonate, calcium silicate, calcium dolomite or combinations thereof.

6. The method as recited in claim 1, wherein the polymeric polycarboxylate calcium salt is added to the aqueous system in a dosing of between about 200-1000 ppm.

7. The method as recited in claim 6, further comprising adding an additional dose of said polymeric polycarboxylate calcium salt at a later time and at a level to maintain an effective corrosion inhibiting concentration of said inhibiting polymeric polycarboxylate calcium salt.

8. The method as recited in claim 7, wherein said additional dose of said polymeric polycarboxylate calcium salt is between 1-100 ppm.

9. The method as recited in claim 7, further including a corrosion meter to determine the feed and decay cycles or additional dose to improve corrosion rates.

10. The method as recited in claim 6, further comprising a dispersant, wherein said dispersant is a co-polymer or ter-polymer including sulfonated monomers.

11. The method as recited in claim 10, wherein said sulfonated monomers are selected from the group consisting of ammonium allyl polyethoxy sulfate (APES) and 2-acrylamido-2-methylpropane sulfonic acid (AMPS).

12. The method as recited in claim 1, wherein (i) the aqueous system comprises a calcium concentration less than 200 ppm of hardness, and the polymeric carboxylate has an average molecular weight from 4660 g to 6270 g, or (ii) the aqueous system comprises a calcium concentration from about 200 ppm to about 400 ppm of hardness, and the polymeric carboxylate has an average molecular weight from about 2000 g to about 2500 g.

13. The method as recited in claim 1, wherein said calcium salt is selected from the group consisting of calcium carbonate, calcium magnesium carbonate, and a combination thereof.

* * * * *